United States Patent
Bates

(10) Patent No.: US 9,111,033 B2
(45) Date of Patent: Aug. 18, 2015

(54) COMPILING SOURCE CODE FOR DEBUGGING WITH USER PREFERRED SNAPSHOT LOCATIONS

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/448,543

(22) Filed: Apr. 17, 2012

(65) Prior Publication Data

US 2013/0275947 A1 Oct. 17, 2013

(51) Int. Cl.
G06F 9/45 (2006.01)
G06F 11/36 (2006.01)

(52) U.S. Cl.
CPC .............. *G06F 11/3624* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 4,953,084 A | 8/1990 | Meloy et al. | |
| 6,091,896 A | 7/2000 | Curreri et al. | |
| 6,256,777 B1 | 7/2001 | Ackerman | |
| 6,434,741 B1 | 8/2002 | Mirani et al. | |
| 6,553,565 B2 | 4/2003 | Click, Jr. et al. | |
| 6,795,963 B1 | 9/2004 | Andersen et al. | |
| 2006/0064676 A1 | 3/2006 | Chavan | |
| 2009/0144705 A1 | 6/2009 | Oda | |
| 2011/0131561 A1 | 6/2011 | Adams, III et al. | |
| 2012/0042303 A1* | 2/2012 | Demetriou et al. | ........... 717/129 |
| 2013/0275948 A1* | 10/2013 | Bates et al. | ................... 717/124 |

OTHER PUBLICATIONS

Chambers et al., "Debugging Optimized Code With Dynamic Deoptimization", Proceedings of the ACM SIGPLAN 1992 Conference on Programming Language Design and Implementation, Jul. 1992, pp. 32-43, vol. 27, Issue 7, ACM New York, NY, USA.
Bivens et al., "Debugging Optimized Code Via Tailoring", Proceedings of the 1994 ACM SIGSOFT International Symposium on Software Testing and Analysis, Aug. 1994, pp. 1-21, ACM New York, NY, USA.

* cited by examiner

*Primary Examiner* — Chuck Kendall
(74) *Attorney, Agent, or Firm* — Edward J. Lenart; James R. Nock; Kennedy Lenart Spraggins LLP

(57) ABSTRACT

Compiling source code for debugging, including: receiving, by an optimizing compiler from a debugger, a user specification of preferred breakpoint locations in the source code; compiling, by the optimizing compiler, the source code, wherein compiling includes inserting a snapshot at one or more of the preferred breakpoint locations, and recording the location of each inserted snapshot; and providing, to the debugger by the optimizing compiler, the recorded locations of each inserted snapshot along with the compiled source code.

16 Claims, 5 Drawing Sheets

COMPILING SOURCE CODE FOR DEBUGGING WITH USER PREFERRED SNAPSHOT LOCATIONS

BACKGROUND OF THE INVENTION

1. Field of the Invention

The field of the invention is data processing, or, more specifically, methods, apparatus, and products for compiling source code for debugging and debugging such compiled source code.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems evolve, software applications also evolve. Applications are increasingly more complex and computationally powerful. Such applications may be cumbersome in execution. To reduce the complexity of executing such applications, optimizing compilers are used to compile source code of an application into machine executable instructions while tuning or optimizing portions of the application. Such optimizations may be directed to minimize or maximize some attributes of the executable computer program. For example, an optimizing compiler may attempt to minimize the time needed to execute a program or to minimize the amount of memory used during execution. The optimizing compiler makes these changes by removing, rearranging, simplifying, or modifying the original source code instructions.

When an optimizing compiler compiles source code for debugging, the optimized portions of the source code are often removed from a debugger's scope given that the original source code instructions viewed by the debugger may not directly correspond to the same machine instructions generated by the optimizing compiler. That is, optimized portions of the application are generally not debuggable. To indicate to a debugger the portions of the source code which are debuggable, the optimizing compiler may insert a snapshot. A snapshot, as the term is used in this specification, is a directive and a specification of one or more variables, where the directive enables a user of a debugger to establish a breakpoint in a debug session at the location of the snapshot and to examine the specified variables when program execution reaches the snapshot location. Such snapshots, when inserted by an optimizing compiler, are inserted without any regard to a debug user's preference.

SUMMARY OF THE INVENTION

Methods, apparatus, and products for compiling source code for debugging are disclosed in this specification. Compiling source code for debugging in accordance with embodiments of the present invention includes receiving, by an optimizing compiler from a debugger, a user specification of preferred breakpoint locations in the source code and compiling, by the optimizing compiler, the source code. Compiling the source code includes inserting a snapshot at one or more of the preferred breakpoint locations, and recording the location of each inserted snapshot. Once compiled, the optimizing compiler provides, to the debugger, the recorded locations of each inserted snapshot along with the compiled source code.

Methods, apparatus, and products for debugging source code are also described in this specification. Debugging source code in accordance with embodiments of the present invention includes: providing, by a debugger to an optimizing compiler, a user specification of preferred breakpoint locations; receiving, by the debugger from the optimizing compiler, compiled source code that includes snapshots inserted at one or more of the preferred breakpoint locations; receiving, by the debugger from the optimizing compiler, a recording of locations of each inserted snapshot; and, responsive to a user request, establishing, by the debugger, a breakpoint at a location of an inserted snapshot.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
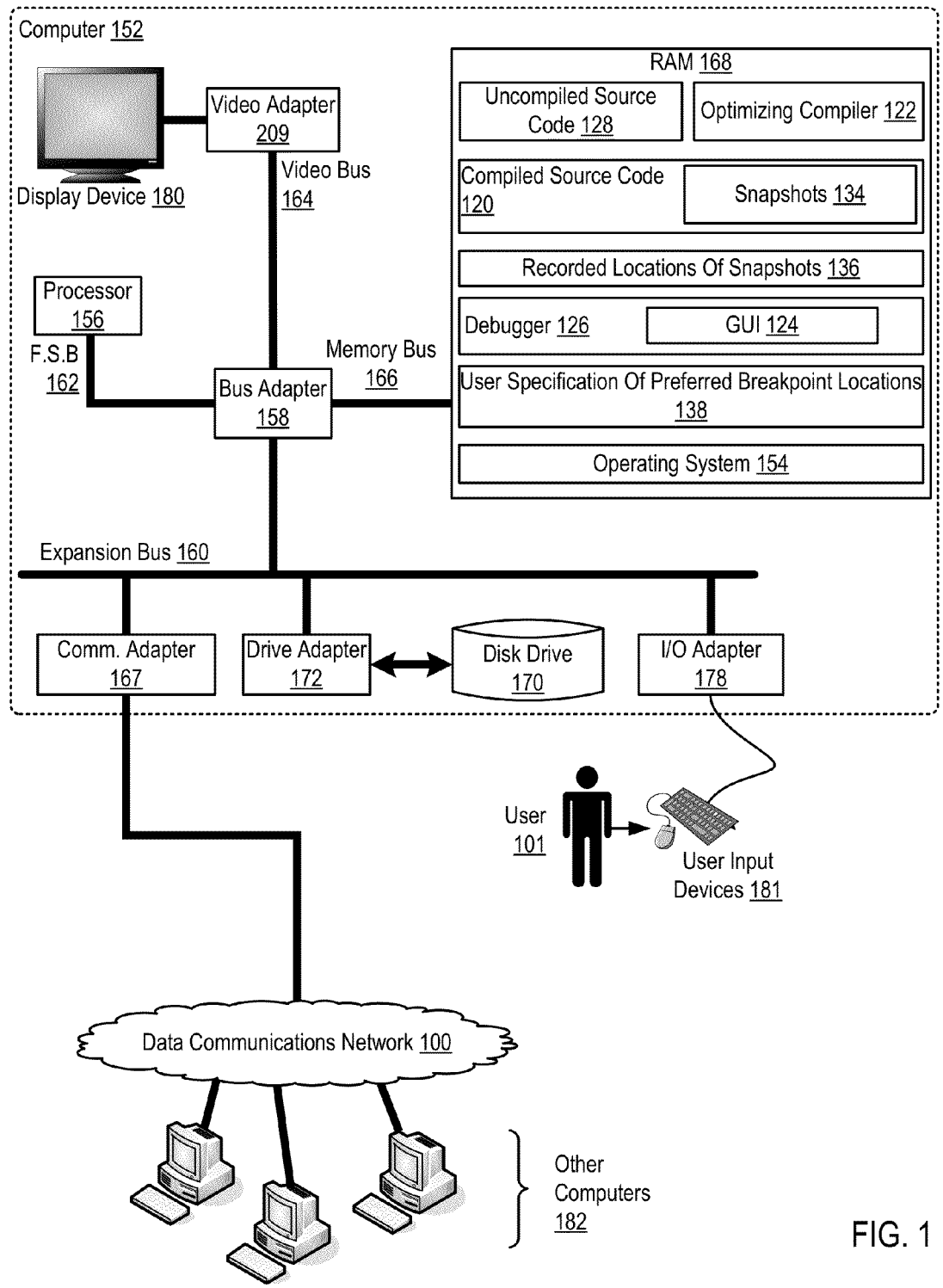
FIG. 1 sets forth a network diagram of a system for compiling source code for debugging and debugging the source code according to embodiments of the present invention.

Exemplary methods, apparatus, and products for compiling source code for debugging and debugging such source in accordance with the present invention are described with reference to the accompanying drawings, beginning with FIG. 1. FIG. 1 sets forth a network diagram of a system for compiling source code for debugging and debugging the source code according to embodiments of the present invention. The system of FIG. 1 includes automated computing machinery comprising an exemplary computer (152) useful in compiling source code for debugging and debugging such source according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an optimizing compiler (122) and a debugger (126). A debugger is a computer program that is used to test and debug other programs. A compiler is a computer program or set of programs that transforms source code written in a programming language (the source language) into another computer language (the target language). The most common reason for wanting to transform source code is to create an executable program. The debugger in the example of FIG. 1 provides a graphical user interface ('GUI') (124) through which a user (101) may interact.

An optimizing compiler is a compiler that is configured to tune the output of the compiler to minimize or maximize some attributes of an executable computer program. Such optimization may include minimizing the time taken to execute a program or minimizing the amount of memory utilized by the program during program execution. The compiler can output a debuggable program that includes debuggable information that may describe the data type of variables or functions and correspondence between source line numbers and addresses in executable code.

The optimizing compiler (122) of FIG. 1 is configured for compiling source code in accordance with embodiments of the present invention and the debugger (126) in the example of FIG. 1 is configured for debugging source code in accordance with embodiments of the present invention.

The debugger (126) in the example of FIG. 1 is configured to provide, to the optimizing compiler (122), a user specification (138) of preferred breakpoint locations. The term 'preferred breakpoint locations' as used in this specification may refer to a single line of source code, a predefined number of source code lines, a function call, a function, a set of lines comprising declarations, a set of lines comprising definitions, or some other portion of source code. The debugger (126) may provide the user specification (138) to the optimizing compiler (122) in a variety of ways including, for example, as part of an object file, as a predefined data structure, through a notification or message, or in other ways as will occur to readers of skill in the art.

The optimizing compiler (122) may then receive the user specification of preferred breakpoint locations in the source code and compile the source code (128). In compiling the source code (128), the optimizing compiler, in accordance with embodiments of the present invention, inserts a snapshot (136) at one or more of the preferred breakpoint locations and recording the location (136) of each inserted snapshot. As explained above an optimizing compiler may insert snapshots to render portions of the source code debuggable. In prior art optimizing compilers, snapshots are included during compiling without any regard to a user's (101) preference. In some cases in the prior art, the optimizing compiler may fail to insert snapshots at locations at which a user (101) may prefer to later insert a breakpoint during a debug session and insert snapshots at locations at which a user does not prefer to insert a breakpoint during a debug session. In the former example, the compiler effectively removes debug control from the user. In the latter example, the compiler increases the amount of compile time needlessly, and reduces the amount of optimization which may be performed at locations which need not be debugged during a later debug session.

Once the compiler (122) compiles the uncompiled source code (128) into compiled source code (120), the compiler (122) provide, to the debugger (126), the recorded locations (136) of each inserted snapshot (134) along with the compiled source code (120). The compiler (122) may provide the recorded locations of the inserted snapshots to the debugger in a variety of ways including, for example, storing the recorded locations (136) in a data structure at a memory location accessible by and known to the debugger.

The debugger (126) may then receive, from the optimizing compiler (122), the compiled source code (120) that includes snapshots (134) inserted at one or more of the preferred breakpoint locations and receive the recording (136) of locations of each inserted snapshot. The debugger (126) may receive the compiled code (120) and the recorded locations (136) of inserted snapshots in a variety of ways including, loading the source code and the recorded locations upon establishment of a debug session of the compiled source code (120).

Once the compiled source code is loaded for debugging, the debugger may establish a breakpoint at a location of an inserted snapshot (134) responsive to a user request. The debugger may insert the breakpoint responsive to command to insert the breakpoint at a particular source code line number, in response to a 'step' command or in another way as will occur to readers of skill in the art. The debugger (126), upon such a user request to insert a breakpoint, may determine whether a breakpoint may be inserted by inspecting the recorded locations (136) of inserted snapshots. If the location at which the insertion of the breakpoint is requested is included in recorded locations (136), the debugger may insert the breakpoint. In this way, the compiler and debugger may enable compiling and debugging of source code with regard to a user's preference of breakpoint locations. Optimization of portions of code at which a user does not prefer a breakpoint may be increased, while portions source code at which a user does prefer a breakpoint will be ensured to be debuggable.

Also stored in RAM (168) is an operating system (154). Operating systems useful compiling source code for debugging and debugging such source according to embodiments of the present invention include UNIX™, Linux™, Microsoft XP™, AIX™, IBM's i5/OS™, and others as will occur to those of skill in the art. The operating system (154), optimizing compiler (122), uncompiled source code (128), compiled source code (120), debugger (126), recorded locations of snapshots (136), and the variable value modification profile (138) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for compiling source code for debugging and debugging such source according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for compiling source code for debugging and debugging such source according to embodiments of the present invention include modems for wired dial-up communications, Ethernet (IEEE 802.3) adapters for wired data communications, and 802.11 adapters for wireless data communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

The compiler (122) and the debugger (126) in the example of FIG. 1 are both modified in accordance with embodiments of the present invention. Although the two may operate separately in accordance with embodiments of the present invention, the may also be included in a single system. For ease of explanation, therefore, FIG. 2 sets forth a flow chart illustrating an exemplary method of compiling source code for debugging as well as debugging such source code according to embodiments of the present invention.

Figure 2:
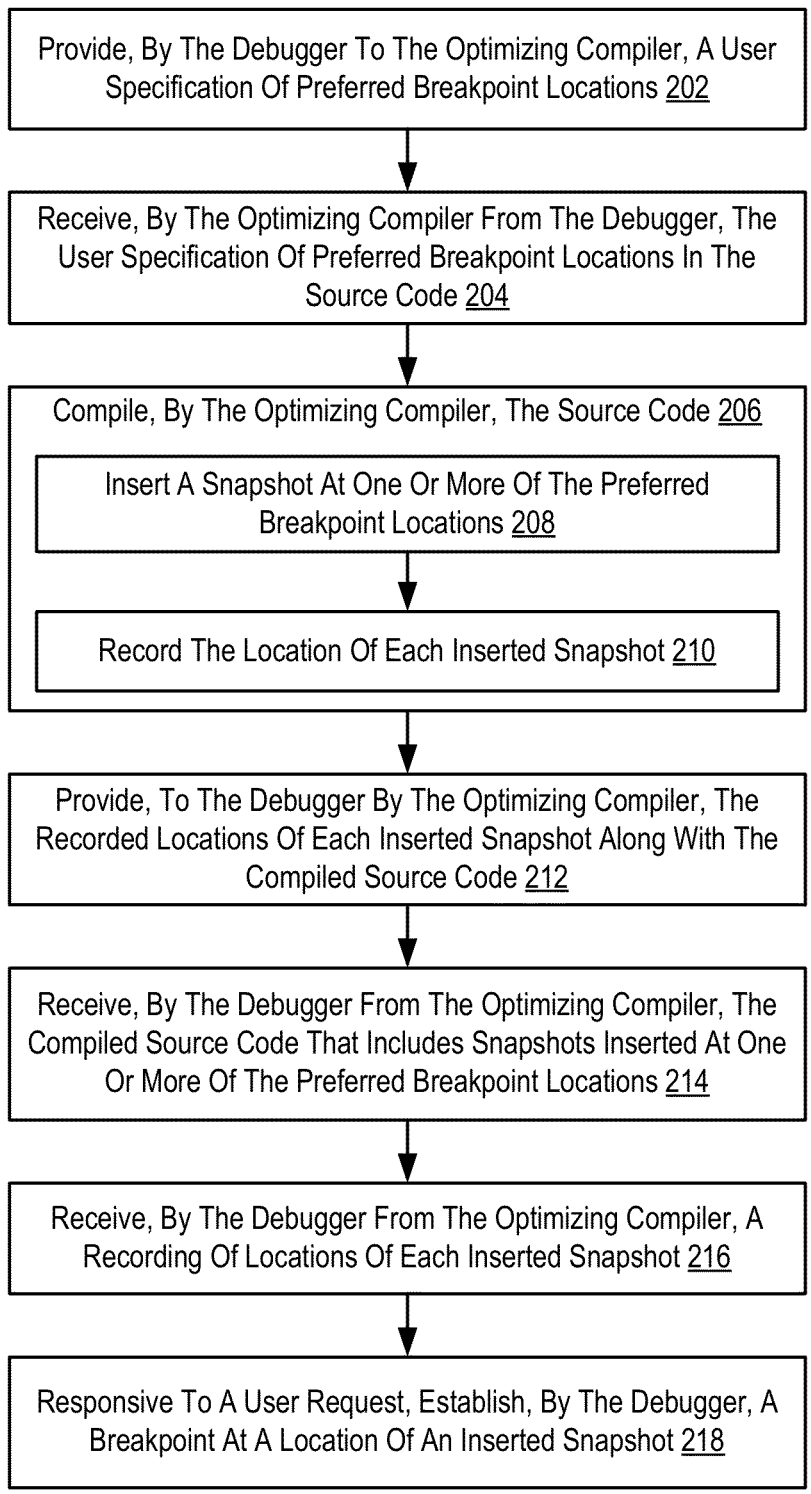
FIG. 2 sets forth a flow chart illustrating an exemplary method of compiling source code for debugging and debugging such source code according to embodiments of the present invention.

The method of FIG. 2 includes providing (202), by a debugger to an optimizing compiler, a user specification of preferred breakpoint locations. A user specification of preferred breakpoint locations as the term is used in this specification refers to a specification of source code locations at which a user may prefer to insert a breakpoint during a debug session of the source code. The user specification may be implemented in a variety of ways: as a table, a list, a linked list, file, library or other data structure as will occur to readers of skill in the art. Providing (202) a user specification of preferred breakpoint locations to an optimizing compiler may be carried out in a variety of ways including, for example, as part of an object file, as part of the source code itself, by storing a predefined data structure in a predefined memory location accessible by and known to the compiler, through a notification or message, or in other ways as will occur to readers of skill in the art.

The method of FIG. 2 also includes receiving (204), by an optimizing compiler from a debugger, a user specification of preferred breakpoint locations in the source code. Receiving (204) a user specification of preferred breakpoint locations in the source code may be carried out in a variety of ways including, for example, by loading the specification at compile time along with source code in an uncompiled state.

The method of FIG. 2 also includes compiling (206), by the optimizing compiler, the source code. In the method of FIG. 2, compiling (206) the source code includes inserting (208) a snapshot at one or more of the preferred breakpoint locations and recording (210) the location of each inserted snapshot. Rather than inserting snapshots at source code locations without regard to user preference, the optimizing compiler may insert such snapshots at locations specified in the user specification of preferred breakpoint locations. In some embodiments, the optimizing compiler may insert snapshots only at locations specified in the user specification of preferred breakpoint locations. In other embodiments, the optimizing compiler may insert snapshots at all locations specified in the user specification of preferred breakpoint locations, while also inserting snapshots at other locations. In yet other embodiments, the optimizing compiler may be configured to insert snapshots at some, but not all locations specified in the user specification of preferred breakpoint locations. In all cases, however, the optimizing compiler inserts at least one snapshot at a location specified in the user specification of preferred breakpoint locations and in dependence upon that specification, rather than in dependence upon normal the optimizing compiler's normal operating procedures.

The method of FIG. 2 also includes providing (212), to the debugger by the optimizing compiler, the recorded locations of each inserted snapshot along with the compiled source code. The compiler may provide (212) the recorded locations of the inserted snapshots to the debugger in a variety of ways including, for example, storing the recorded locations in a data structure at a memory location accessible by and known to the debugger. The recorded locations of the snapshots inform the debugger of locations within the source code that breakpoints may be inserted. That is, the recorded locations of the snapshots inform the debugger of debuggable portions of the source code.

The method of FIG. 2 also includes receiving (214), by the debugger from the optimizing compiler, compiled source code that includes snapshots inserted at one or more of the preferred breakpoint locations and receiving (216), by the debugger from the optimizing compiler, a recording of locations of each inserted snapshot.

Receiving (214) the compiled source code and receiving (216) the recording of locations of each inserted snapshot may be carried out in various ways including for example, loading the source code and the recorded locations upon establishment of a debug session of the source code. A user, for example, may specify, to the debugger, a location in a file directory at which the compiled source code is stored and may separately specify a location in a file directory at which the recorded locations of snapshot locations is stored. In another example embodiment, a user may only specify the file location of the compiled source, where the compiled source code includes an identification of a memory location of a file (or other data structure) implementing the recorded locations of inserted snapshots.

Responsive to a user request, the method of FIG. 2 continues by establishing (218), by the debugger, a breakpoint at a location of an inserted snapshot. Establishing a breakpoint at a location of an inserted snapshot may be carried out in various ways including, for example, by determining whether the requested location is included in the recording of snapshot locations and, if so, inserting the breakpoint at the requested location. The user request may take various forms as well.

The user request, for example, may be direct command to insert a breakpoint at a line of source code. In another example embodiment, the user request may be a request to execute a step command.

Figure 3:
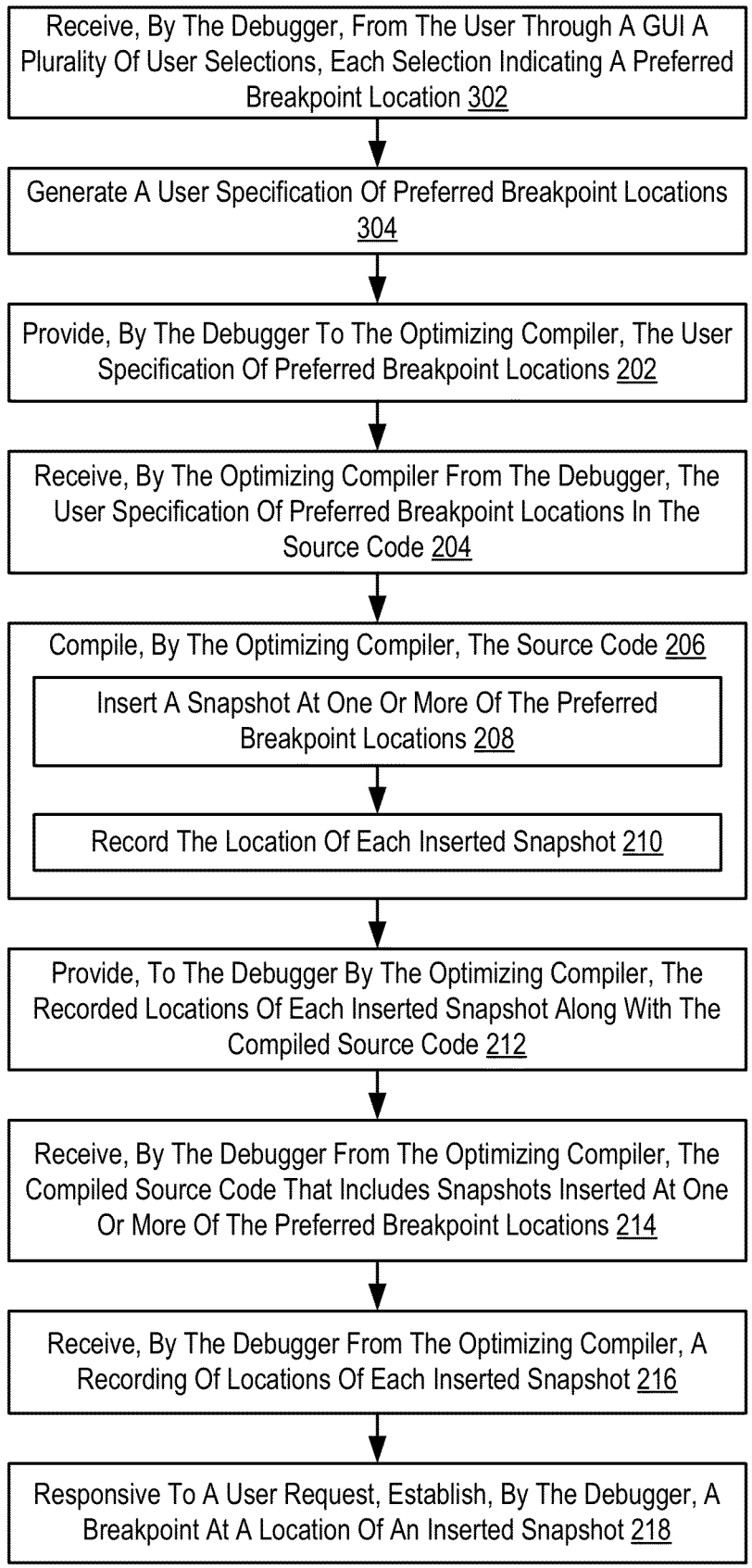
FIG. 3 sets forth a flow chart illustrating another exemplary method of compiling source code for debugging as well as debugging such source code according to embodiments of the present invention.

For further explanation, FIG. 3 sets forth a flow chart illustrating another exemplary method of compiling source code for debugging as well as debugging such source code according to embodiments of the present invention. The method of FIG. 3 is similar to the method of FIG. 2 including as it does: providing (202) a user specification of preferred breakpoint locations to an optimizing compiler; receiving (204) the user specification; compiling (206) the source code; providing (212) the recorded locations of each inserted snapshot along with the compiled source code to the debugger; receiving (214) the compiled source code; receiving (216) the recording of locations of each inserted snapshot; and establishing (218), by the debugger, a breakpoint at a location of an inserted snapshot.

The method of FIG. 3 differs from the method of FIG. 2, however, in that the method of FIG. 3 also includes receiving (302), by the debugger, from the user through a graphical user interface ('GUI') a plurality of user selections, each selection indicating a preferred breakpoint location. Receiving (302) a plurality of user selections indicating preferred breakpoint locations may be carried out in variety of ways including, for example, by receiving through the GUI a user specification of source code line numbers in a text field, receiving a mouse-click at a source code line that prompts a drop-down selection list from which the user selects an option to 'make line debuggable,' receiving one or more keyboard keystrokes predefined to indicate to the debugger that a user requests the line be debuggable in future debug sessions and the like.

The method of FIG. 3 also includes generating (304), by the debugger responsive to the plurality of selections, the user specification of preferred breakpoint locations. Generating (304) the user specification of preferred breakpoint locations in the method of FIG. 3 may be carried out by creating a file and inserting a list of source code line numbers, memory locations, function names, or other identifier of source code locations.

Figure 4:
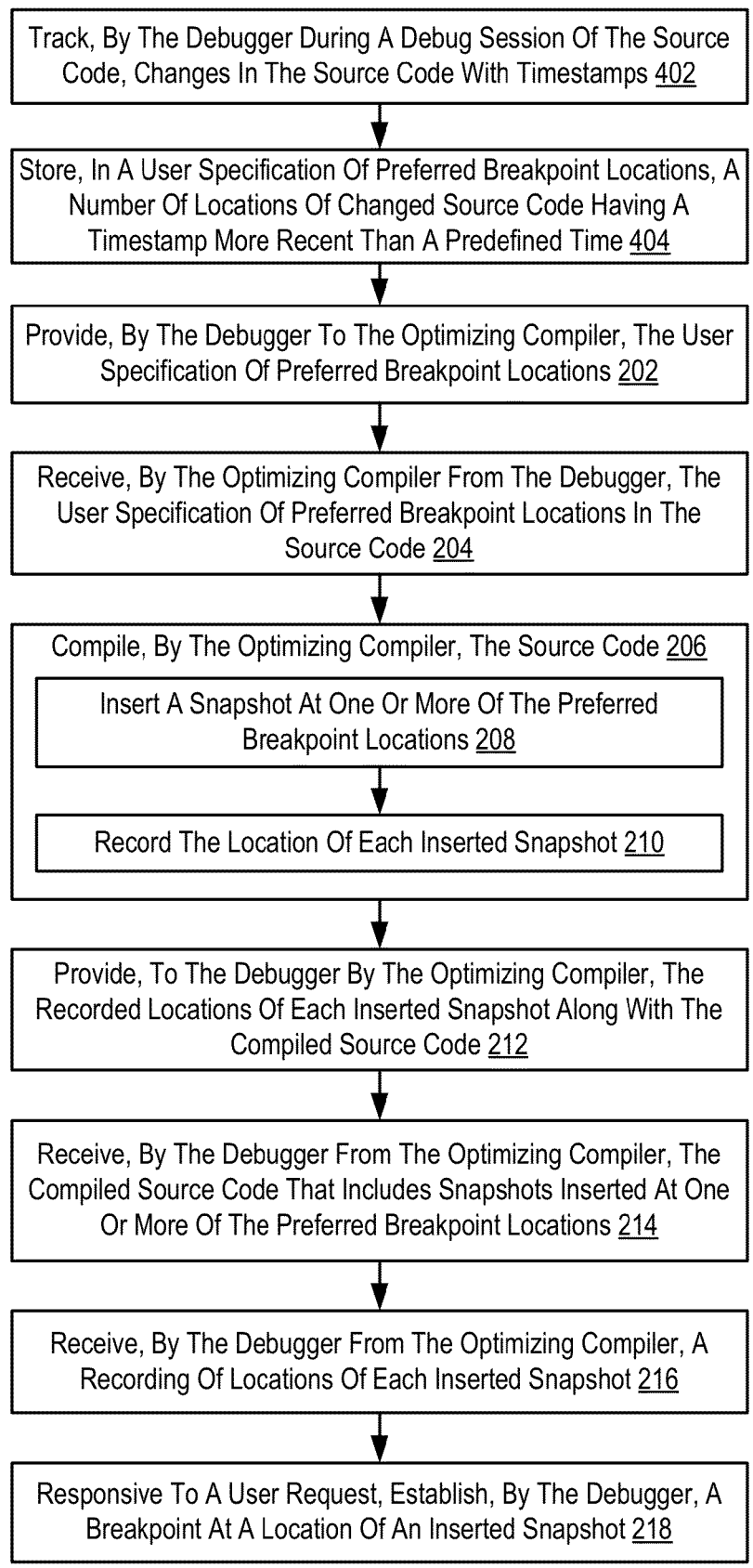
FIG. 4 sets forth a flow chart illustrating another exemplary method of compiling source code for debugging as well as debugging such source code according to embodiments of the present invention.

For further explanation, FIG. 4 sets forth a flow chart illustrating another exemplary method of compiling source code for debugging as well as debugging such source code according to embodiments of the present invention. The method of FIG. 4 is similar to the method of FIG. 2 including as it does: providing (202) a user specification of preferred breakpoint locations to an optimizing compiler; receiving (204) the user specification; compiling (206) the source code; providing (212) the recorded locations of each inserted snapshot along with the compiled source code to the debugger; receiving (214) the compiled source code; receiving (216) the recording of locations of each inserted snapshot; and establishing (218), by the debugger, a breakpoint at a location of an inserted snapshot.

The method of FIG. 4 differs from the method of FIG. 2, however, in that the method of FIG. 4 includes tracking (402), by the debugger during a debug session of the source code, changes in the source code with timestamps. Instead of identifying explicitly source code locations at which the user prefers to insert a breakpoint (as in the method of FIG. 3), the method of FIG. 4 sets forth a method in which the debugger infers a user's preference. In this way, the method of FIG. 4 also includes storing (404), in the user specification of preferred breakpoint locations, a number of locations of changed source code having a timestamp more recent than a predefined time. Consider, for example, that the debugger stores locations of source code having changed within the last four hours. Those source code locations having changed five hours before, will not be included in the user specification of preferred breakpoint locations. In this way, only the most recent source code locations having been changed are included in the user specification of preferred breakpoint locations.

Figure 5:
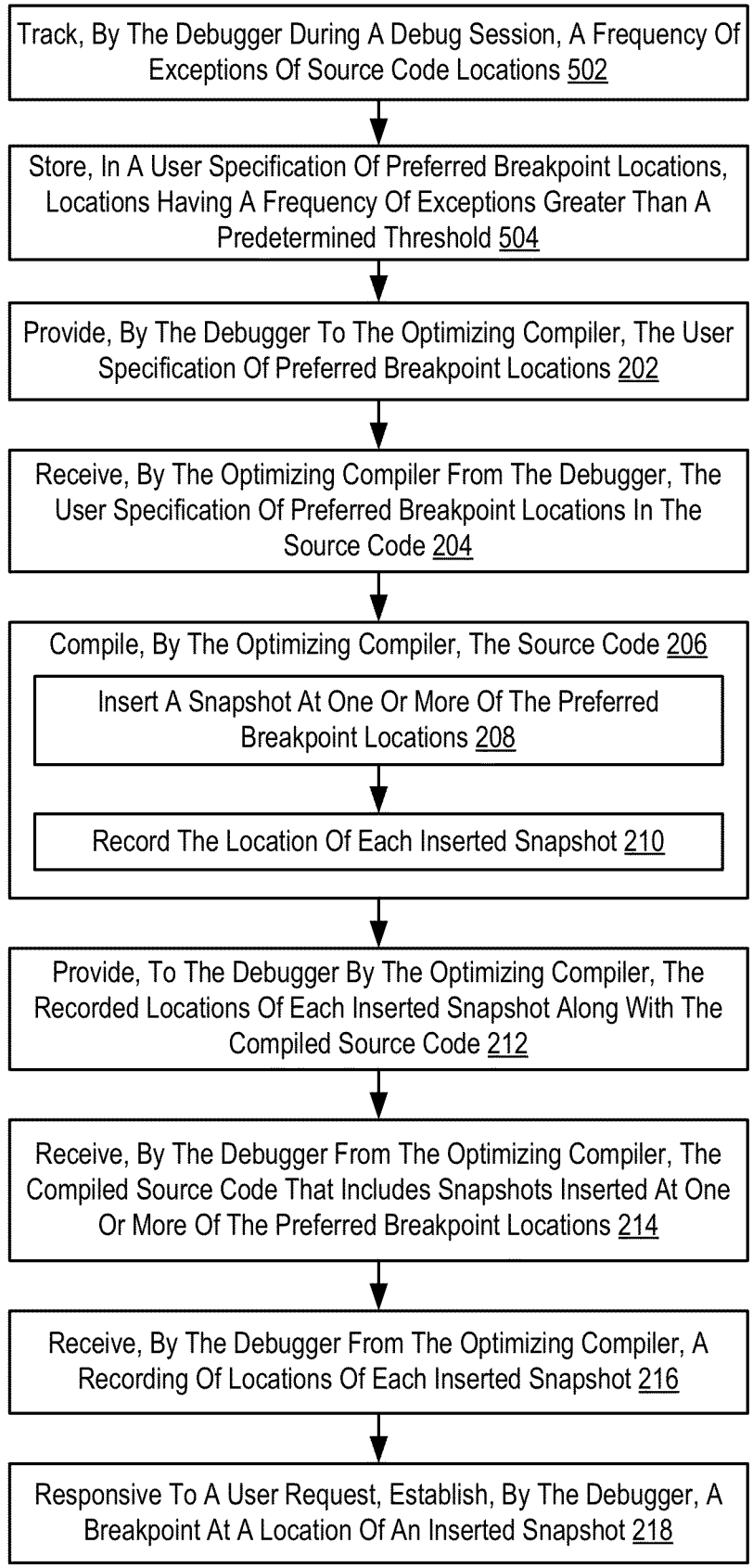
FIG. 5 sets forth a flow chart illustrating another exemplary method of compiling source code for debugging as well as debugging such source code according to embodiments of the present invention.

For further explanation, FIG. 5 sets forth a flow chart illustrating another exemplary method of compiling source code for debugging as well as debugging such source code according to embodiments of the present invention. The method of FIG. 5 is similar to the method of FIG. 2 including as it does: providing (202) a user specification of preferred breakpoint locations to an optimizing compiler; receiving (204) the user specification; compiling (206) the source code; providing (212) the recorded locations of each inserted snapshot along with the compiled source code to the debugger; receiving (214) the compiled source code; receiving (216) the recording of locations of each inserted snapshot; and establishing (218), by the debugger, a breakpoint at a location of an inserted snapshot.

The method of FIG. 5 differs from the method of FIG. 2, however, in that the method of FIG. 5 also includes tracking (502), by the debugger during a debug session, a frequency of exceptions of source code locations. An exception, as the term is used here, is anything causing a halt in execution of the program being debugged other than commands issued by a user or breakpoints (and the like) inserted by the debugger. Generally, an exception is an error in execution.

The method of FIG. 5 also includes storing (504), in the user specification of preferred breakpoint locations, locations having a frequency of exceptions greater than a predetermined threshold. In this way, the most 'problematic' portions of source code are included in the user specification of preferred breakpoint locations, insuring that in the those portions of source code are debuggable in future debug session.

FIGS. 3, 4, and 5 set forth three ways generating a user specification of preferred breakpoint locations. Although described separately, readers of skill in the art will immediately recognize that these, and other ways, may be performed in any combination. For example, a debugger configured in accordance with embodiments of the present invention may enable a user to directly specify locations at which the user prefers a breakpoint to be inserted and also track source code modification, including the most recently changed portions of source code in the user specification of breakpoint locations. Each combination of these three methods, as well as combinations with other methods not described here, is well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiling source code for debugging, the method comprising:
    receiving, by an optimizing compiler from a debugger, a user specification of preferred breakpoint locations in the source code;
    compiling, by the optimizing compiler, the source code, including:
        inserting a snapshot at one or more of the preferred breakpoint locations, wherein each snapshot comprises a directive and a specification of one or more variables, the directive enabling the user to establish a breakpoint in a debug session at the location of the snapshot and examine the specified variables when execution reaches the snapshot location and
        recording the location of each inserted snapshot; and
    providing, to the debugger by the optimizing compiler, the recorded locations of each inserted snapshot along with the compiled source code.

2. The method of claim 1 further comprising:
    receiving, by the debugger, from the user through a graphical user interface ('GUI') a plurality of user selections, each selection indicating a preferred breakpoint location; and
    generating, by the debugger responsive to the plurality of selections, the user specification of preferred breakpoint locations; and
    providing, by the debugger to the optimizing compiler, the user specification of preferred breakpoint locations.

3. The method of claim 1 further comprising:
tracking, by the debugger during a debug session of the source code, changes in the source code with timestamps;
storing, in the user specification of preferred breakpoint locations, a number of locations of changed source code having a timestamp more recent than a predefined time; and
providing, by the debugger to the optimizing compiler, the user specification of preferred breakpoint locations.

4. The method of claim 1 further comprising:
tracking, by the debugger during a debug session, a frequency of exceptions of source code locations;
storing, in the user specification of preferred breakpoint locations, locations having a frequency of exceptions greater than a predetermined threshold; and
providing, by the debugger to the optimizing compiler, the user specification of preferred breakpoint locations.

5. An apparatus for compiling source code for debugging, the apparatus comprising a computer processor, a computer memory operatively coupled to the computer processor, the computer memory having disposed within it computer program instructions that, when executed by the computer processor, cause the apparatus to carry out the steps of:
receiving, by an optimizing compiler from a debugger, a user specification of preferred breakpoint locations in the source code;
compiling by the optimizing compiler the source code including:
inserting a snapshot at one or more of the preferred breakpoint locations, wherein each snapshot comprises a directive and a specification of one or more variables, the directive enabling the user to establish a breakpoint in a debug session at the location of the snapshot and examine the specified variables when execution reaches the snapshot location and
recording the location of each inserted snapshot; and
providing, to the debugger by the optimizing compiler, the recorded locations of each inserted snapshot along with the compiled source code.

6. The apparatus of claim 5 further comprising computer program instructions that, when executed by the computer processor, cause the apparatus to carry out the steps of:
receiving, by the debugger, from the user through a graphical user interface ('GUI') a plurality of user selections, each selection indicating a preferred breakpoint location; and
generating, by the debugger responsive to the plurality of selections, the user specification of preferred breakpoint locations; and
providing, by the debugger to the optimizing compiler, the user specification of preferred breakpoint locations.

7. The apparatus of claim 5 further comprising computer program instructions that, when executed by the computer processor, cause the apparatus to carry out the steps of:
tracking, by the debugger during a debug session of the source code, changes in the source code with timestamps;
storing, in the user specification of preferred breakpoint locations, a number of locations of changed source code having a timestamp more recent than a predefined time; and
providing, by the debugger to the optimizing compiler, the user specification of preferred breakpoint locations.

8. The apparatus of claim 5 further comprising computer program instructions that, when executed by the computer processor, cause the apparatus to carry out the steps of:
tracking, by the debugger during a debug session, a frequency of exceptions of source code locations;
storing, in the user specification of preferred breakpoint locations, locations having a frequency of exceptions greater than a predetermined threshold; and
providing, by the debugger to the optimizing compiler, the user specification of preferred breakpoint locations.

9. A computer program product for compiling source code for debugging, the computer program product disposed upon a computer readable medium, the computer program product comprising computer program instructions that, when executed, cause a computer to carry out the steps of:
receiving, by an optimizing compiler from a debugger, a user specification of preferred breakpoint locations in the source code;
compiling by the optimizing compiler the source code including:
inserting a snapshot at one or more of the preferred breakpoint locations, wherein each snapshot comprises a directive and a specification of one or more variables, the directive enabling the user to establish a breakpoint in a debug session at the location of the snapshot and examine the specified variables when execution reaches the snapshot location and
recording the location of each inserted snapshot; and
providing, to the debugger by the optimizing compiler, the recorded locations of each inserted snapshot along with the compiled source code.

10. The computer program product of claim 9 further comprising computer program instructions that, when executed, cause the computer to carry out the steps of:
receiving, by the debugger, from the user through a graphical user interface ('GUI') a plurality of user selections, each selection indicating a preferred breakpoint location; and
generating, by the debugger responsive to the plurality of selections, the user specification of preferred breakpoint locations; and
providing, by the debugger to the optimizing compiler, the user specification of preferred breakpoint locations.

11. The computer program product of claim 9 further comprising computer program instructions that, when executed, cause the computer to carry out the steps of:
tracking, by the debugger during a debug session of the source code, changes in the source code with timestamps;
storing, in the user specification of preferred breakpoint locations, a number of locations of changed source code having a timestamp more recent than a predefined time; and
providing, by the debugger to the optimizing compiler, the user specification of preferred breakpoint locations.

12. The computer program product of claim 9 further comprising computer program instructions that, when executed, cause the computer to carry out the steps of:
tracking, by the debugger during a debug session, a frequency of exceptions of source code locations;
storing, in the user specification of preferred breakpoint locations, locations having a frequency of exceptions greater than a predetermined threshold; and
providing, by the debugger to the optimizing compiler, the user specification of preferred breakpoint locations.

13. A method of debugging source code, the method comprising:
providing, by a debugger to an optimizing compiler, a user specification of preferred breakpoint locations;

receiving, by the debugger from the optimizing compiler, compiled source code that includes snapshots inserted at one or more of the preferred breakpoint locations wherein each snapshot comprises a directive and a specification of one or more variables, the directive enabling the user to establish a breakpoint in a debug session at the location of the snapshot and examine the specified variables when execution reaches the snapshot location;

receiving, by the debugger from the optimizing compiler, a recording of locations of each inserted snapshot; and responsive to a user request, establishing, by the debugger, a breakpoint at a location of an inserted snapshot.

14. The method of claim 5 further comprising:

receiving, by the debugger, from the user through a graphical user interface ('GUI') a plurality of user selections, each selection indicating a preferred breakpoint location; and generating, by the debugger responsive to the plurality of selections, the user specification of preferred breakpoint locations.

15. The method of claim 1 further comprising:

tracking, by the debugger during a debug session of the source code, changes in the source code with timestamps; and storing, in the user specification of preferred breakpoint locations, a number of locations of changed source code having a timestamp more recent than a predefined time.

16. The method of claim 1 further comprising:

tracking, by the debugger during a debug session, a frequency of exceptions of source code locations; and storing, in the user specification of preferred breakpoint locations, locations having a frequency of exceptions greater than a predetermined threshold.

\* \* \* \* \*